United States Patent [19]

Davis

[11] Patent Number: 5,055,336
[45] Date of Patent: Oct. 8, 1991

[54] WEAR MEMBERS FOR THE INSIDE OF A CHUTE

[76] Inventor: Verlon L. Davis, 1736 Winewood Rd., Birmingham, Ala. 35215

[21] Appl. No.: 484,244

[22] Filed: Feb. 26, 1990

[51] Int. Cl.⁵ .................. B65B 39/00; B02C 23/00; B32B 3/00
[52] U.S. Cl. .................. 428/137; 428/138; 428/99; 428/119; 428/120; 428/139; 428/160; 428/156; 428/164; 428/167; 428/173; 428/192; 428/223; 428/492; 428/425.8; 428/465; 428/908.8; 428/911; 428/67; 192/2 R; 241/183; 241/DIG. 30
[58] Field of Search .......... 428/137, 138, 99, 119, 428/120, 139, 160, 156, 164, 167, 173, 192, 223, 492, 425.8, 465, 908.8, 911, 67; 241/183, DIG. 30; 193/2 R

[56] References Cited

U.S. PATENT DOCUMENTS

| | | | |
|---|---|---|---|
| 3,607,606 | 9/1971 | Beninga | 428/67 |
| 3,883,080 | 5/1975 | Anderson | 241/182 |
| 3,895,982 | 7/1975 | Persson | 241/DIG. 30 |
| 4,120,605 | 10/1978 | Hurst | 428/256 X |
| 4,141,511 | 2/1979 | Anderson | 241/183 |
| 4,424,938 | 1/1984 | Day | 241/DIG. 30 |
| 4,547,985 | 10/1985 | Silins et al. | 428/572 X |
| 4,716,666 | 1/1988 | Potter | 172/751 X |
| 4,835,033 | 5/1989 | Auyer et al. | 428/911 X |
| 4,848,681 | 7/1989 | Eriksson et al. | 241/183 |

Primary Examiner—Ellis P. Robinson
Assistant Examiner—William P. Watkins, III
Attorney, Agent, or Firm—Jennings, Carter, Thompson & Veal

[57] ABSTRACT

A wear member for use in quarry chutes and the like utilizes a plurality of wear strips with a layer of resilient material therebetween. The resilient material may be a natural rubber or synthetic material as urethane. A bottom mounting plate engages a T-shaped base plate mounted to the chute to hold the wear member in an array on the chute surface.

19 Claims, 5 Drawing Sheets

WEAR MEMBERS FOR THE INSIDE OF A CHUTE

FIELD OF THE INVENTION

The present invention relates to mining equipment and more particularly to wear resistant members for lining transfer chutes through which abrasive quarry material is conveyed. More particularly the present invention relates to detachable wear members which can be changed to cover the wall of a chute to provide protection thereto. In even greater particularity, the present invention may be described as a plurality of wear members having a resilient region interspersed between wear resistant members.

BACKGROUND OF THE INVENTION

Present day mining operations in the western states, cause thousands of tons of abrasive and heavy, silicone based quarry material to pass through chutes on the way to processing crushers. Oftentimes the chutes assume a near vertical orientation such that the quarry material accelerates until it reaches the bottom of the chute and then proceeds horizontally. The impact and wear caused thereby results in extensive damage to the chute walls in minimal time. Accordingly, such chutes have been made thicker at the impact area; however, when the wear becomes excessive the operation of the processor must be halted while the expensive, time consuming and arduous repair efforts are undertaken.

Recently, metallic wear runners from excavating buckets such as described in U.S. Pat. No. 4,716,666, have been adapted for use as temporary wear reducers; however, these devices are metallic and wear out in a matter of days. Further complicating the matter is the fact that current wear members have a tendency to become dislodged or broken and then pass into the crusher machinery, thereby damaging the downstream processing machinery. It has been contemplated that resilient members could be used, however the highly abrasive nature of the quarry material destroys resilient members even more rapidly than the metal members. It is also noteworthy to mention that the metallic wear members currently in use are quite heavy and present a danger to workers who must physically carry them into chutes to effect repairs. Therefore, it is clear that a wear element or elements having improved service life is greatly needed.

SUMMARY OF THE INVENTION

It is an object of the present invention to provide a wear covering for mining chutes which will reduce down time for repairs.

Yet another object of the invention is to provide such wear members which are easier to manipulate and carry into the chutes during repair operations.

Still another object of the invention is to provide a wear member which will not damage downstream components if the wear member becomes partially disengaged from the chute.

The present invention accomplishes the above objects and provides other advantages through the use of a novel composite construction which blends the wear resistant characteristics of steel with the impact absorbing characteristics of a resilient material. This combination is achieved by aligning one or more steel bars in a rib-like manner in a layer of urethane or rubber, and attaching the composite material to the chute in a secure manner.

BRIEF DESCRIPTION OF THE DRAWINGS

Wear members embodying features of my invention are depicted in the accompanying drawings which form a portion of this disclosure and wherein:

FIG. 15 is an end view from the upper end of my base plate;

FIG. 16 is an end view from the lower end of my base plate; and

DESCRIPTION OF A PREFERRED EMBODIMENT

Figure 1:
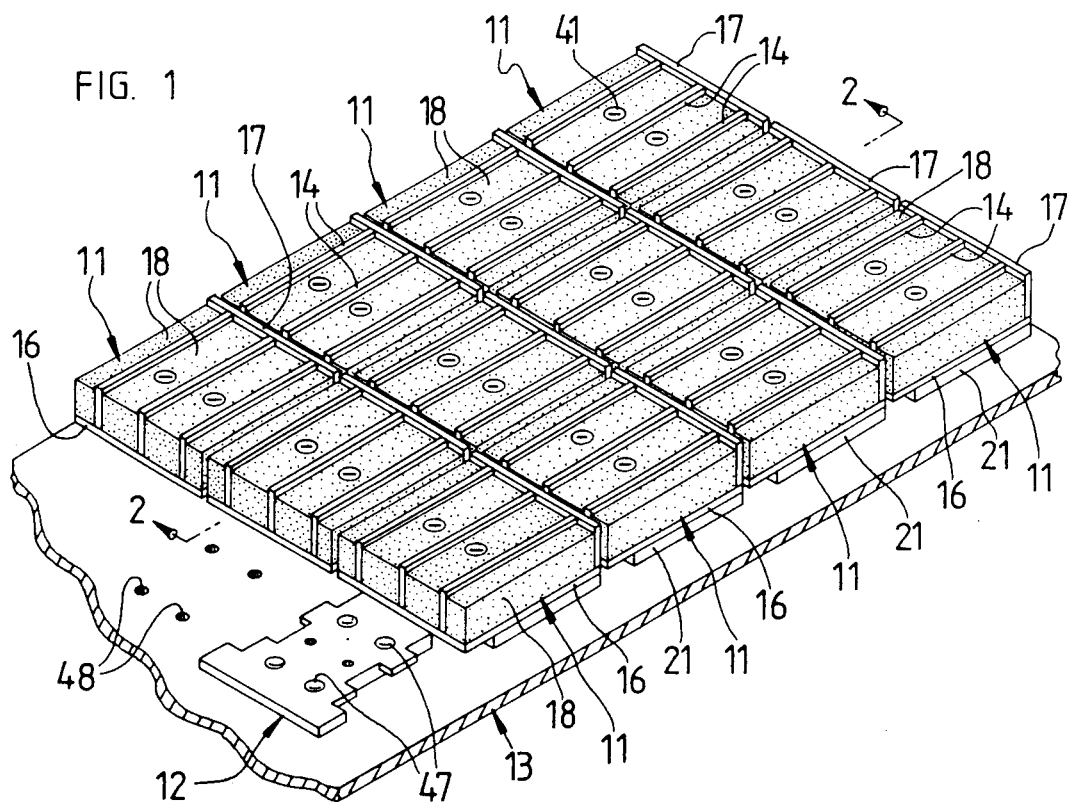
FIG. 1 is a perspective view of the bottom of a chute overlain by a plurality of my wear members.
Figure 2:
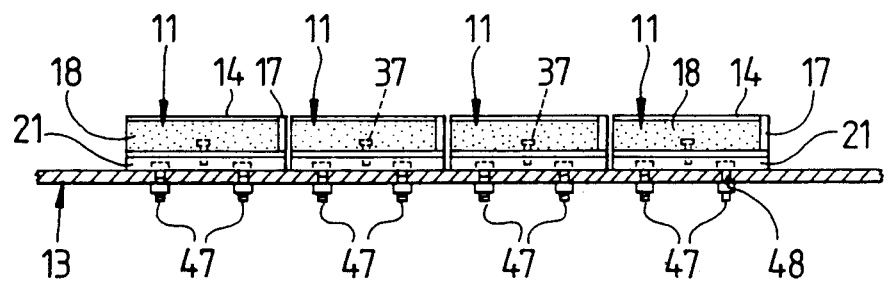
FIG. 2 is a side sectional view along line 2—2 of FIG. 1.
Figure 3:
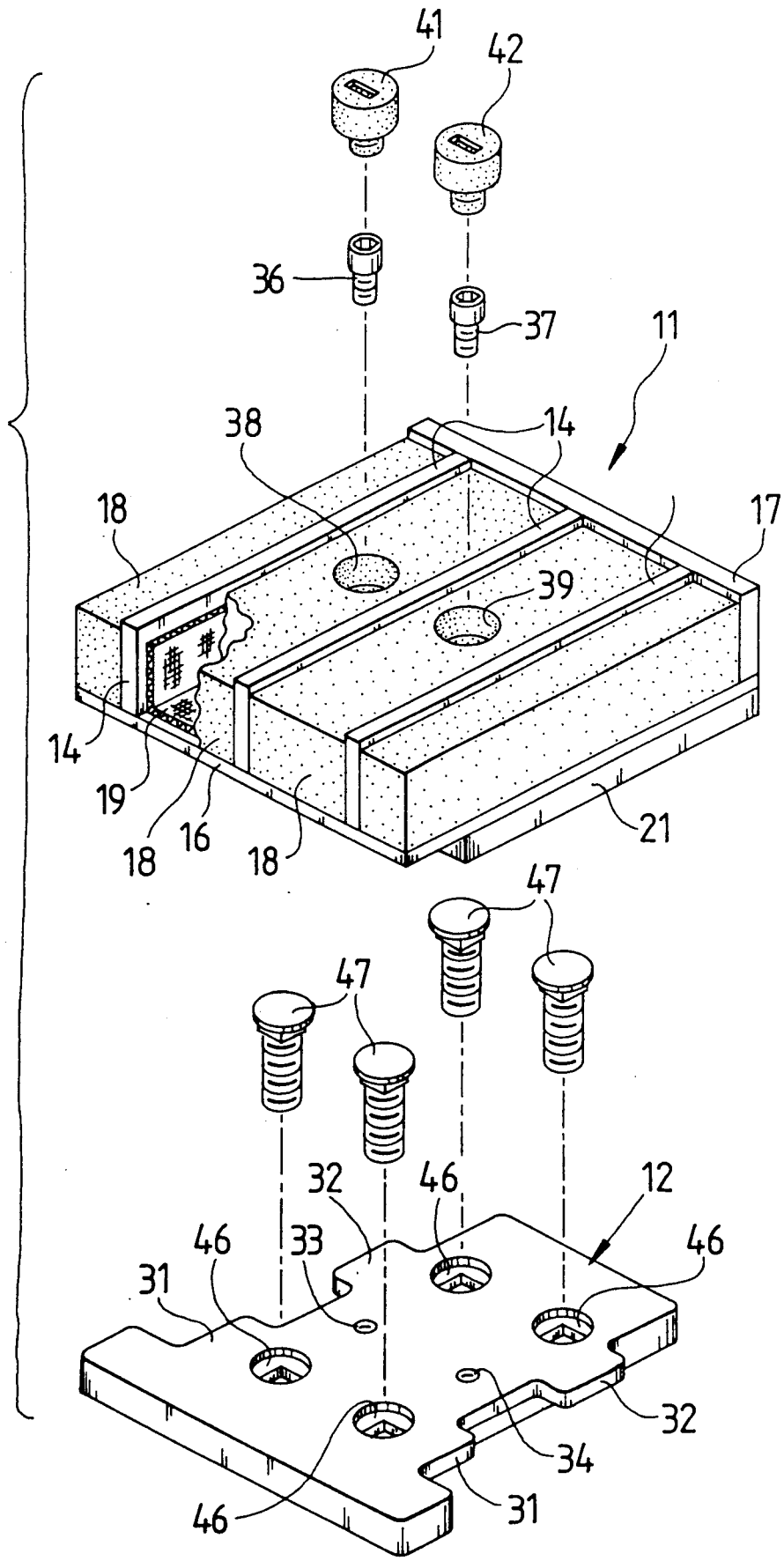
FIG. 3 is an exploded perspective view of my wear member and base plate.
Figure 9:
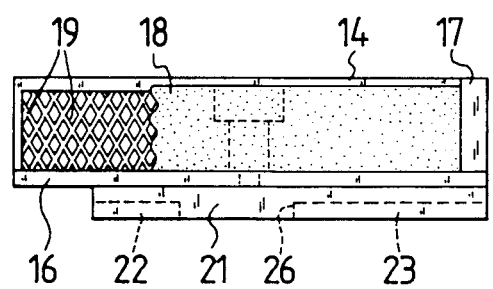
FIG. 9 is a side elevational view partially broken away in the resilient portion.
Figure 10:
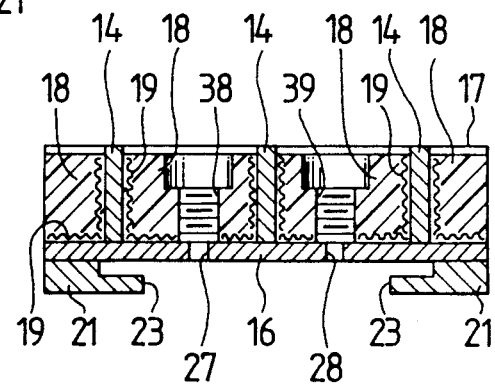
FIG. 10 is a sectional view along line 10—10 of FIG. 6.
Figures 11, 13, 14:
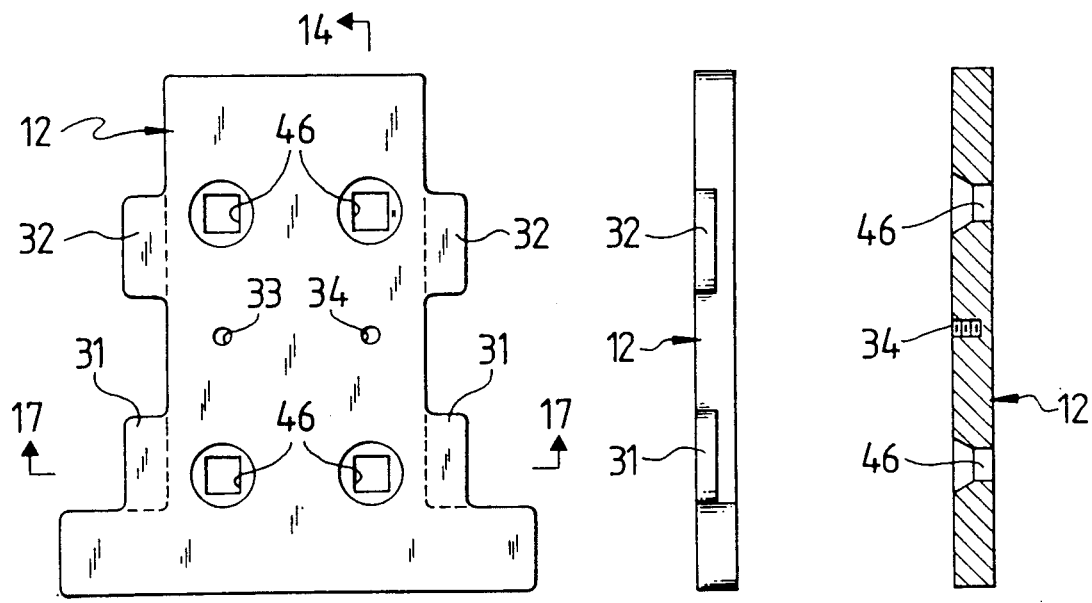
FIG. 11 is a top plan view of my base plate.
FIG. 13 is a side view of my base plate.
FIG. 14 is a sectional view along line 14—14 of FIG. 11.
Figures 12, 17:
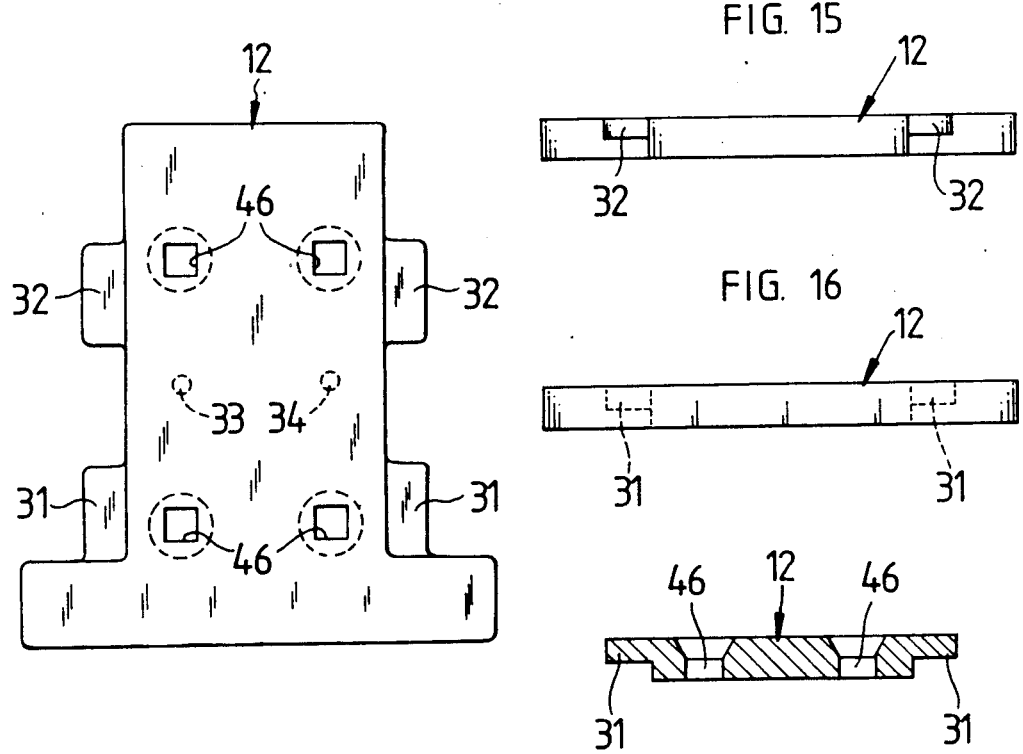
FIG. 12 is a bottom view of my base plate.
FIG. 17 is a sectional view along line 17—17 of FIG. 11.

Referring to the drawings for a clearer understanding of my invention it may be seen in FIGS. 1 and 2 that a plurality of my wear members 11 are formed in a linear array over a plurality of base plates 12 connected to the bottom surface 13 of a chute. As shown in FIGS. 1-3 each wear member 11 includes at least one strip 14 of alloy steel wear plate, which is selected for its wear resistant and impact resistant characteristics. Each strip 14 is a bar-like member having a longitudinal dimension aligned in the direction of travel of the quarry material attached as by welding along a lower edge to a mounting plate 16 made of mild steel. As seen most clearly in FIGS. 2, 3 and 9 a transverse strip 17 of wear resistant steel is affixed to strips 14 and mounting plate 16. It may be seen in FIG. 1 that the strips 14 and transverse strip 17 form somewhat of a lattice above the mounting plate 16. This lattice is filled with a layer 18 of resistant energy absorbent material such as urethane or rubber. As may be seen in FIGS. 3, 9 and 10 this layer is attached to the mounting plate 16 and strips 14 by interstitial engagement with a layer of expanded metal 19 or lath like metal material which is spot welded to these steel members. Thus as the plastic urethane material is poured onto the expanded metal 19 it hardens thereabout providing a secure attachment to the steel members. Of course, if rubber is used, cable members could be passed through apertures in the strips to reinforce the rubber layers.

Figure 4:
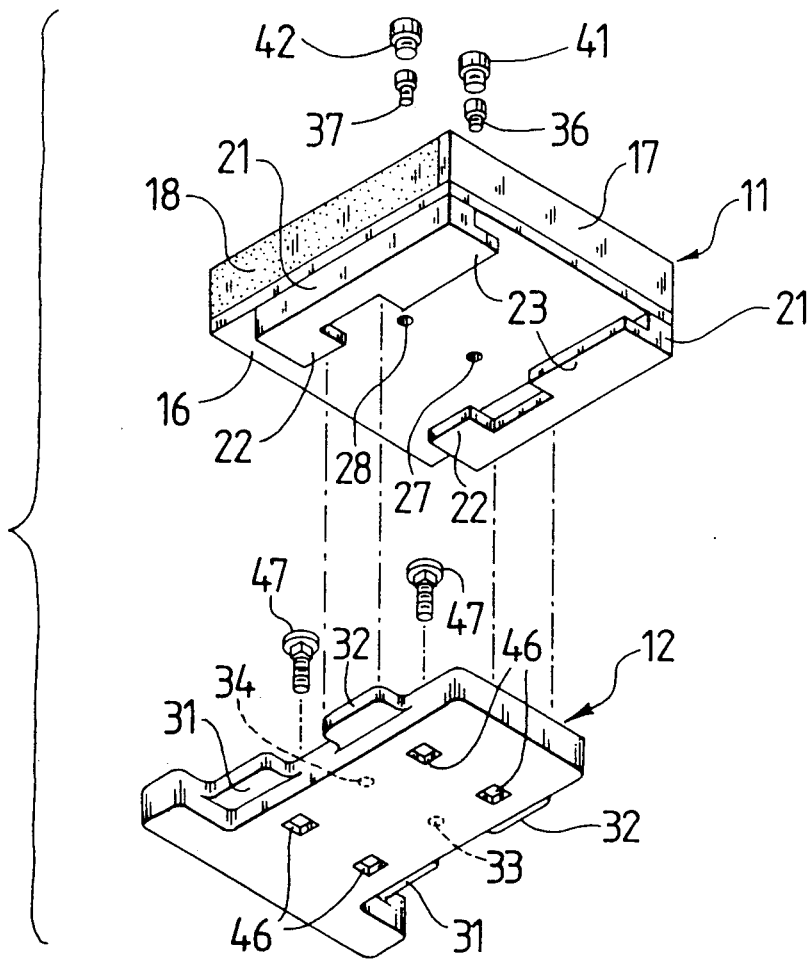
FIG. 4 is a bottom exploded perspective view of my wear member and base plate.
Figure 5:
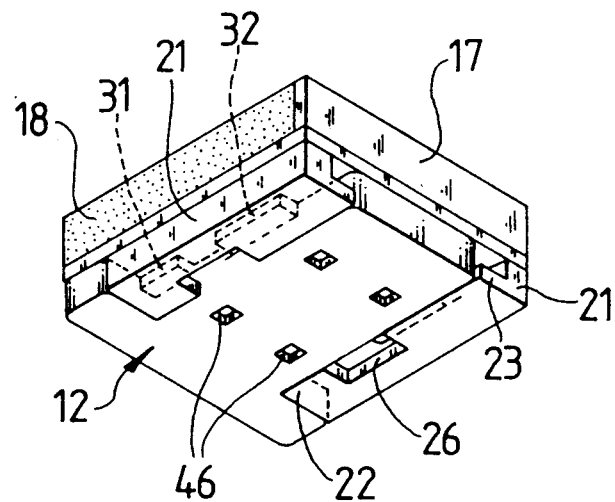
FIG. 5 is a bottom perspective view of my wear member engaged on its associated base plate.
Figure 6:
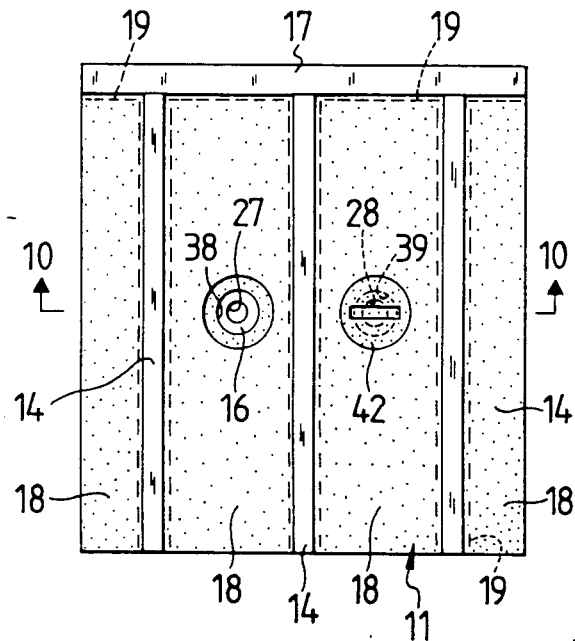
FIG. 6 is a top view of my wear member.
Figure 8:
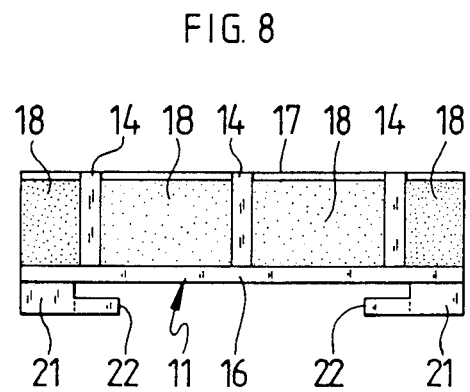
FIG. 8 is a front elevational view of the wear member.

With reference to FIGS. 3-5 it may be seen that the lower outer margin of the mounting plate 16 has a pair of bars 21 affixed thereto. Each bar 21 forms an inwardly facing channel with the mounting plate by forming a pair of inwardly projecting flanges 22 and 23 which are spaced from the mounting plate. The flanges 22 and 23 are spaced apart to form a keyway 26. Also formed in the mounting plate are two smooth bore apertures 27 and 28.

Figure 7:
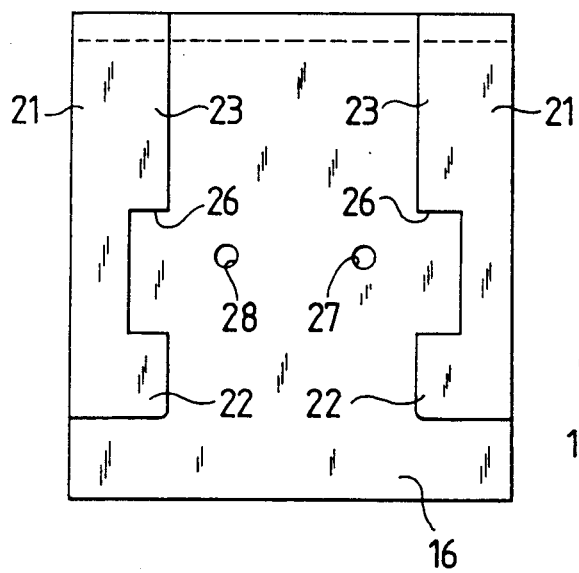
FIG. 7 is a bottom view of a second embodiment of my invention.

Referring to FIGS. 1, 3, 4 and 11-17 it may be seen that base plate 12 is generally T-shaped having a pair of tabs 31 and 32 in each side of the T. Tabs 31 are formed at the lateral extension of the T and tabs 32 are spaced longitudinally along the T. The tabs 31 and 32 are spaced from the surface 13 of the chute to receive flanges 22 and 23 therebetween while the channels in bar 21 receive the tabs therewithin. Base plate 12 also has formed therein a pair of threaded apertures 33 and 34 which align with apertures 27 and 28 when the mounting plate 16 is fully seated against the cross members of the T. A pair of threaded fasteners 36 and 37 pass through apertures 27 and 28 to threadably engage the apertures 33 and 34 to secure the wear member to base plate 12. Layer 18 has a pair of threaded openings 38 and 39 through which fasteners 36 and 37 may be inserted through apertures 33 and 34. A pair of urethane plugs 41 and 42 are threaded into the openings to afford stability to the layer 16. As may be seen in FIG. 7, in another embodiment, the base 21 may simple form a keyway which engages a key on base plate 12.

Base plate 12 also contains a set of apertures 46 through which a set of bolts 47 are inserted to engage apertures 48 in chute surface 13. The apertures are formed to permit the bolts to seat beneath the mounting plate 16 without interfering therewith.

From the foregoing it may be seen that my wear members 11 are securely affixed to the base plates 12 by threaded members 36 and 37 and chute surface 13 with bolts 47. Further, the shape of the base plate 12 provides a downward stop against the bars 21 such that impact of the quarry material urges the wear member against the T of the base plate. It may also be seen that my wear member is substantially lighter in weight than the current metal wear pads, thus easier to manipulate. Yet, experimental testing has shown my wear members to last up to four times as long as the currently used wear member. It is ostensibly noteworthy to mention that the strips 14 may vary in number and separation in accordance with the size of the quarry material such that quarry material impacts these strips before impacting the resilient layer 18. It may also be possible to substitute a ceramic layer for the resilient layer to resist wear from smaller particles.

While I have shown my invention in one form, it will be obvious to those skilled in the art that it is not so limited but is susceptible of various changes and modifications without departing from the spirit thereof.

What I claim is:

1. A wear member for a chute wherein heavy abrasive material such as quarry material is conveyed, comprising a mounting plate, a least one rigid wear-resistant member affixed to said mounting plate and extending longitudinally thereof in the direction of movement of material transported thereover wherein said member is a steel plate; a layer of resilient material affixed to said mounting plate and being coextensive therewith, said layer having a depth substantially equal to the height of said rigid member, wherein said resilient material is selected from the group consisting of urethane and rubber, and wherein said rigid member extends normal to said mounting plate and through said layer of resilient material; and means affixed beneath said mounting plate for attaching said mounting plate to said chute such that said rigid member and said resilient material are fully exposed to said abrasive material.

2. A wear member as defined in claim 1 wherein said layer of resilient material is rubber.

3. A wear member as defined in claim 1 wherein said layer of resilient material is urethane.

4. A wear member as defined in claim 3 wherein said urethane layer is affixed to said mounting plate by interstitial engagement with a layer of lath material affixed to said mounting plate.

5. A wear member as defined in claim 4 wherein said lath material is expanded metal welded to said mounting plate and said wear-resistant steel plate.

6. A wear member as defined in claim 5 further comprising a wear resistant steel plate orthogonally mounted to said mounting plate and said wear resistant member at one end thereof.

7. A wear member as defined in claim 3 further comprising a wear resistant steel plate orthogonally mounted to said mounting plate and said wear resistant member at one end thereof.

8. A wear member as defined in claim 7 wherein said urethane layer is affixed to said mounting plate by interstitial engagement with a layer of lath material affixed to said mounting plate.

9. A wear member as defined in claim 1 further comprising a wear resistant steel plate orthogonally mounted to said mounting plate and said wear resistant member at one end thereof.

10. A wear member as defined in claim 3 wherein said means for mounting comprises a base plate detachably affixed on the upper conveying surface of a chute, said base plate being substantially T-shaped and having a pair of spaced apart flanges on either side thereof, said flanges being spaced from said conveying surface to overlie a pair of inwardly facing retaining members affixed to the bottom of said mounting plate and spaced therefrom.

11. A wear member as defined in claim 10 further comprising a pair of threaded connecting members passing through a pair of apertures in said mounting plate for threaded engagement with a pair of threaded apertures in said base plate, and a pair of urethane plug members overlying said connecting members.

12. A wear member as defined in claim 1 wherein said means for mounting comprises a base plate detachably affixed on the upper conveying surface of a chute, said base plate being substantially T-shaped and having a pair of spaced apart flanges on either side thereof, said flanges being spaced from said conveying surface to overlie a pair of inwardly facing retaining members affixed to the bottom of said mounting plate and spaced therefrom.

13. A wear resistant lining for a chute used to convey quarry materials comprising a plurality of wear members detachable affixed to and overlying an associated plurality of base members affixed to and overlying the conveying surface of a chute each wear member of said plurality of wear members including a mounting plate engageable with one base member of said plurality of base members, a layer of resilient material affixed to and coextensive with said mounting plate, and at least one wear resistant rigid member affixed to said mounting plate extending longitudinally thereof in the direction of movement of material transported thereover and extending normal thereto through said layer of resilient material such that said layer of resilient material and said rigid member are exposed to said quarry material wherein said resilient material is selected from the group consisting of urethane and rubber and said wear resistant rigid member is a steel plate.

14. A wear member as defined in claim 13 wherein said layer of resilient material is urethane.

15. A wear member as defined in claim 14 wherein said urethane layer is affixed to said mounting plate by interstitial engagement with a layer of lath material affixed to said mounting plate.

16. A wear member as defined in claim 13 further comprising a wear resistant steel plate orthogonally mounted to said mounting plate and said wear resistant member at one end thereof.

17. A wear member as defined in claim 13 further comprising a pair of threaded connecting members passing through a pair of apertures in said mounting plate for threaded engagement with a pair of threaded apertures in said base plate, and a pair of urethane plug members overlying said connecting members.

18. A wear member as defined in claim 17 wherein said layer of resilient material is urethane.

19. A wear member as defined in claim 13 wherein said means for mounting comprises a base plate detachably affixed on the upper conveying surface of a chute, said base plate being substantially T-shaped and having a pair of spaced apart flanges on either side thereof, said flanges being spaced from said conveying surface to overlie a pair of inwardly facing retaining members affixed to the bottom of said mounting plate and spaced therefrom.

* * * * *